United States Patent [19]

Rich et al.

[11] Patent Number: 4,776,174
[45] Date of Patent: Oct. 11, 1988

[54] REFRIGERANT RECOVERY DEVICE

[75] Inventors: Donald G. Rich, Fayetteville; Howard W. Sibley, Baldwinsville, both of N.Y.

[73] Assignee: Carrier Corporation, Syracuse, N.Y.

[21] Appl. No.: 155,488

[22] Filed: Feb. 12, 1988

[51] Int. Cl.[4] .............................................. F25B 45/00
[52] U.S. Cl. ........................................ 62/77; 62/292; 261/81; 261/94; 261/DIG. 72
[58] Field of Search ................ 62/77, 149, 292, 174, 62/324.4, 474; 261/81, 94, 140.1, 140.2, DIG. 72; 208/101

[56] References Cited

U.S. PATENT DOCUMENTS

| | | | |
|---|---|---|---|
| 2,341,430 | 2/1944 | Elsey | 62/77 |
| 3,155,472 | 11/1962 | Huppke | 261/81 X |
| 3,225,554 | 12/1965 | Alexander | 62/77 |
| 3,443,392 | 5/1969 | Alexander | 62/77 |
| 3,503,221 | 3/1970 | Martin | 62/77 |
| 4,178,765 | 12/1979 | Slayton | 62/474 X |
| 4,431,521 | 2/1984 | Roartz et al. | 208/101 X |
| 4,637,881 | 1/1987 | Scinto | 62/474 X |

*Primary Examiner*—William E. Tapolcai
*Attorney, Agent, or Firm*—Thomas J. Wall

[57] ABSTRACT

A refrigerant recovery device comprises a pressure vessel filled with packings, such as Berl saddles, that provide a large surface area for mass transfer. The vessel is partly filled with a refrigeration-quality oil. The pressure vessel is mounted on a stand and pivoted so that it can easily be inverted periodically for coating the packing material with the oil. A flexible hose connects the vessel with a refrigeration or air conditioning unit, and a shut off valve is provided as is a check valve which prevents out flow of oil from the vessel. The oil in the vessel absorbs the refrigerant, and causes its partial pressure in the vessel to be reduced, so that refrigerant vapor flows from the refrigeration or air conditioning unit into the vessel. After the refrigerant has been absorbed, the valve can be closed, and the vessel returned to a central site for reclamation.

14 Claims, 1 Drawing Sheet

R22 RECOVERY
ABSORPTION IN DTE-26

REFRIGERANT RECOVERY DEVICE

BACKGROUND OF THE INVENTION

This invention relates to techniques for recovering a refrigerant fluid from mechanical refrigeration equipment, and is more particularly directed to a refrigerant recovery device which absorbs a charge of a chlorofluorocarbon refrigerant.

It is the conventional practice for repair or service personnel working with small air conditioner or heat pump units to release the refrigerant from the unit to the atmosphere prior to servicing it. This means that over a long period of time, a rather large quantity of chlorofluorocarbon is released into the environment.

Recently, there has been a great concern over the adverse effect of chlorofluorocarbon refrigerants on the earth's upper atmosphere, and particularly on the depletion of the ozone layer in the ionosphere. These refrigerants are highly effective as long as they remain contained within their systems. On the other hand, the recognized danger from the continued release of these refrigerants to the atmosphere has led to proposed legislation to limit or curb production and use of chlorofluorocarbon refrigerants. Consequently, there is an increased need for simple devices that can be used in the field to recover refrigerant for future reuse, or for later chemical treatment. However, no one has previously proposed a simple, yet suitable technique for this.

While it has been well known that many hydrocarbon oils can readily absorb chlorofluorocarbon refrigerants, this fact has never been put to any effective use in a refrigerant recovery system.

OBJECTS AND SUMMARY OF THE INVENTION

It is an object of this invention to provide a simple and effective recovery device for the capture and containment of a standard charge of chlorofluorocarbon refrigerant from a refrigeration, air conditioning, or heat pump unit.

It is a more particular object of this invention to provide a chlorofluorocarbon refrigerant recovery device which reversibly absorbs the refrigerant into a quantity of refrigeration-quality oil contained within a container, and permits capture of the refrigerant even when the unit's compressor is off or inoperative.

It is a further object of this invention to provide a refrigerant recovery device which is simple and portable, and which permits the extraction of refrigerant from units in the field.

In accordance with one aspect of this invention, the refrigerant recovery device comprises a pressure vessel that is filled with a packing material that provides a large surface area for mass transfer. A packing saddle, such as a Berl saddle, is preferred. The vessel is partially filled with a refrigerationquality oil. A check valve on the inlet of the pressure vessel prevents outflow of the oil, and a shutoff valve and flexible pressure hose connect the pressure vessel to the unit to be serviced.

The unit is preferably mounted on a stand and is pivoted by means of trunnions on the vessel, so that the pressure vessel can be inverted and rocked periodically when the device is connected to the refrigeration, air conditioning, or heat pump unit. These units can be referred to alternatively as mechanical heat transfer equipment. The refrigerant vapor will flow into the vessel and be absorbed into the oil. By rocking the device periodically, the oil will coat the packings, thus providing a large wetted area for absorption, and thereby increasing the rate of refrigerant withdrawal. The rate of transfer from the unit to the pressure vessel can be further increased either by cooling the vessel or by heating the refrigerant in the unit. In the latter case this can be accomplished by running the indoor or outdoor fan. Approximately 4.0 pounds of oil can be used to absorb a typical charge (1.0 pounds of R22 refrigerant) for a one-ton system.

After the refrigerant has been absorbed into the oil, the shutoff valve is closed, and the device can be brought to a central site for reclamation of the refrigerant. Alternatively, the refrigerant could be returned to the unit after servicing is complete.

The above and many other objects, features, and advantages of this invention will be more fully understood from the ensuing description of a preferred embodiment, which should be considered in connection with the accompanying drawing.

DETAILED DESCRIPTION OF THE PREFERRED EMBODIMENT

Figure 1:
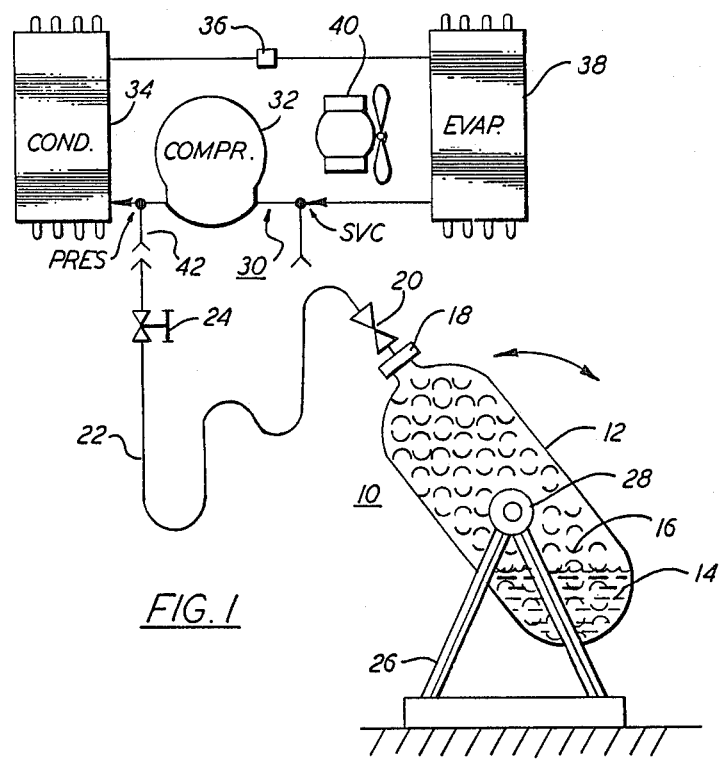
FIG. 1 is a system schematic view of the device of this invention.

With reference to the Drawing, and initially to FIG. 1 thereof, a refrigerant recovery device 10 of this invention comprises a pressure vessel 12, suitably of about a gallon capacity, and partially filled with a refrigeration quality oil 14. For use in servicing a one ton refrigeration or air conditioning unit, abut four pounds of oil would represent a suitable quantity. The entire internal volume of the vessel 12 is filled with packings 16, for example Berl saddles, which can be wetted with the oil 14 to increase the mass transfer surface area and hasten the absorption of refrigerant into the oil 14. The preferred Berl saddle packings 16 have a nominal diameter of about 0.25 inches, and a surface area density of about 270 square feet per cubic foot, and a void fraction, when completely and densely packed, of about 60 percent. At an inlet or neck opening 18 of the vessel 12 is a check valve 20 which ensures that the oil does not accidentally outflow from the vessel 12. A long, flexble pressure hose 22, which has a shutoff valve 24 therein, is employed to connect the pressure vessel 12 to a unit to be serviced. A stand 26 for the vessel 12 rockably mounts the vessel 12 by means of pivots 28, for example trunnions on the sides of the vessel. This permits the vessel to be inverted periodically so that the oil 14 will coat the packings 16 and thus provide a maximum wetted area for absorption.

A typical air conditioning, refrigeration, or heat pump unit 30 can comprise a compressor 32, a condenser coil 34, an expansion valve 36, and an evaporator coil 38, all connected with suitable tubes to define a closed refrigeration circuit. A fan 40 blows air across the evaporator coils 38, and a similar fan, not shown, can be provided for the condenser coil 34. It is also understood that there are certain ancillary parts, such as the receiver/dryer, etc. which may form a part of the unit 30, but which are omitted here in this illustration. Inlet valves 42 are provided on the pressure and suction side of the compressor 32 for adjusting the amount of refrigerant within the system. In this case, the pressure hose 22 of the refrigerant recovery device 10 is connected to the outlet valve 42 at the pressure side. The device could alternatively be connected to the valve of the suction side.

The refrigerant recovery device 10 of this invention absorbs the refrigerant vapor from the unit 30 in accordance with Raoult's Law. That law provides that the partial pressure P of a component within a liquid mixture is equal to the mole fraction X of that component within a mixture times the vapor pressure P of pure component at that temperature. In the unit 30, the refrigerant is relatively pure, but in the recovery device 10, the refrigerant forms a mixture with the oil 14. Therefore, the partial pressure of refrigerant within the vessel 12 is much lower than the pressure within the unit, and refrigerant will continue to flow into the refrigerant recovery device 10 until only vapor remains in the unit 30. The vapor pressure of the oil 14 is generally not significant, i.e., on the order of a fraction of one psi. For a standard one ton air conditioning unit having a full charge of R22 refrigerant, there is approximately onepound of the refrigerant in the system. The vapor pressure of R22 refrigerant at 90 degrees F. is 177 psia. The quantity of oil 14 in the recovery device 10 is 4.0 pounds. In this case, a naphthenic oil is used, namely SUNISO 3GS, which has a molecular weight of 435 g/mol. This means that the mole fraction X of refrigerant to oil, when all of the refrigerant has been absorbed into the oil, will be 0.558. According to Raoult's law, the partial pressure $P_p$ of refrigerant vapor within the vessel 12 will be 98.8 psia at 90 degrees F.

However, some compensation must be made for temperature rise of the oil within the tank. That is, there is a latent heat of condensation of the refrigerant vapor which will cause the temperature of the oil 14 to rise as the R22 refrigerant is absorbed into it. The specific heat of the oil is given according to the relationship $C = (0.338 + 0.00045F)/S.G.$, where S.G. is the specific gravity of oil, here 0.88. Thus, at 90 degrees F. the specific heat of the oil will be 0.43 BTU per degree F. The heat $H_c$ added to the oil from condensation of the refrigerant vapor will be 76.7 BTU per pound, and for a refrigerant charge of 1.0 pound, the total heat $H_c$ comes to 76.7 BTU. Because this heat applies toward the temperature rise of the oil $\Delta T$, the heat $H_c$ can be expressed as $H_c = W_t (oil) \times 0.430\ BTU/lb \times \Delta T$. In this example, this can be expressed as 76.7 $BTU = 4.0\ lb \times 0.430\ BTU/lb \times \Delta T$. This yields T=45.9 degrees F., i.e., 45 degrees F. Therefore the final temperature $T_f$ of the oil 14 is T=90 degrees F. +45 degrees F.=135 degrees F.

The vapor pressure $P_T$ of the R22 refrigerant at 135 degrees F. is 318 psia. This means that according to Raoult's law the partial pressure in the vessel 12 comes to $P_P = 318 \times 0.558 = 177$ psia.

It is noted that for this example the final pressure of the refrigerant within the recovery device 10 is just equal to the vapor pressure of the refrigerant within the unit 30. This means that the oil 14 will just absorb all of the R22 refrigerant charge at an ambient temperature of 90 degrees F. All that remains in the system is the residual vapor at 177 psia, and all of the liquid refrigerant (having been converted to vapor) is removed. In such a case the rate of mass transfer of the pure refrigerant would diminish as the partial pressure of refrigerant in the oil increased. Therefore, to maintain a high rate of transfer, it is a simple matter to reduce the oil temperature in the vessel 12 by cooling it. This can be carried out by immersing the vessel in a bath of ice or water, or by natural convection of air past fins on the vessel exterior. alternatively the temperature of the refrigerant in the unit can be raised, by blowing heated air past the evaporator coil 30 or past the condenser coil 34.

It is desirable that the same oil be used in the refrigerant absorption process as is used in the refrigeration system. Therefore, for R22 and R12 refrigerants, a naphthenic oil would be used, such as SUNISO 3GS; for R11 refrigerant, that a paraffinic oil, such as Mobil DTE 26 could be used.

For the above system the required number of one quarter inch Berl saddles would be 3,165, which would provide 8.1 square foot of surface for absorption and would weigh 0.33 pounds.

Figure 2:
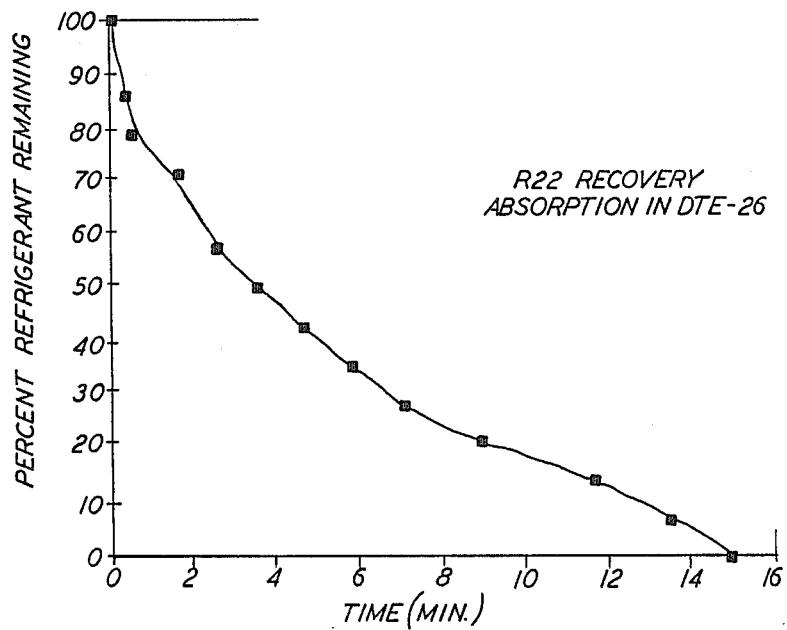
FIG. 2 is a chart for explaining the operation of this invention.

Results of an experimental testing of a system embodying this invention can be explained with reference to the chart of FIG. 2. In that example, a system containing an 0.17 lb charge of R22 refrigerant was heated with 130 degree F. air. The R22 refrigerant was absorbed into a glass vessel containing 1.7 lbs. of DTE-26 refrigerant quality oil. The refrigerant remaining within the system was measured at time intervals, and the results are as shown in the chart. The ordinate shows the percentage of R22 refrigerant remaining in the system, while the abscissa shows elapsed time. The recovery of refrigerant relied entirely on absorptivity of the oil, and no mechanical compression of any type was employed. No agitation or inverting was used. In this system, approximately one-half of the refrigerant was absorbed in about four minutes, and substantially all of the liquid refrigerant was completely absorbed into the oil after about fifteen minutes. If periodic agitation or inversion of the vessel had been done, or if high capacity packings, such as Berl saddles as previously defined, had been used the slope of this graph would be steepened remarkably, and, as aforesaid, the entire charge (i.e., about one pound) of refrigerant from a one-ton air conditioning unit could be absorbed within about two minutes into about four pounds of oil.

While this invention has been described with respect to a single embodiment, it should be recognized that the invention is not limited to that precise embodiment. Rather, many modifications and variations would present themselves to those of skill in the art without departing from the scope and spirit of this invention, as defined in the appended claims.

What is claimed is:

1. Refrigerant recovery device for receiving and storing a chlorofluorocarbon refrigerant from mechanical heat transfer equipment, comprising:
    a pressure vessel having an inlet opening;
    conduit means for connecting the inlet opening of the pressure vessel to said equipment;
    a quantity of a liquid oil partly filling said pressure vessel; and
    packing means in said vessel which provides an increase in mass transfer area of said oil for the refrigerant.

2. Refrigerant recovery device according to claim 1 in which said vessel contains 35 to 40 pounds of oil per cubic foot of vessel volume.

3. Refrigerant recovery device according to claim 1 wherein said conduit means includes a flexible hose, a shut off valve, and a check valve which prevents accidental outflow of the oil from the vessel.

4. Refrigerant recover device according to claim 1 further comprising means for periodically coating said packing means with oil.

5. Refrigerant recovery device according to claim 4 wherein said means for coating the packing means with oil includes a stand and pivot means on said pressure vessel supporting the vessel on said stand so that the vessel can be rocked to coat the packing means with oil.

6. Refrigerant recovery device according to claim 1 wherein said packing means includes a multiplicity of saddle packings that substantially fill the vessel.

7. Regrigerant recovery device according to claim 1 for the recovery of a refrigerant wherein said oil is regrigeration grade.

8. Regrigerant recovery device according to claim 7 wherein said oil is of the same type as present in the mechanical heat transfer equipment.

9. Method of recovery of a chlorofluorocarbon refrigerant from mechanical heat transfer equipment comprising the steps of:
 connecting to said equipment a pressure vessel that has an inlet opening and a conduit connecting said inlet opening to said equipment, the vessel containing a partial fill of an oil which is absorbent of said refrigerant and a fill of packing elements which increase the available mass transfer area of said oil in said vessel;
 opening a valve in said conduit to permit refrigerant vapor to flow from the equipment through the conduit to the oil in the vessel to become absorbed in said oil; and
 closing said valve when the refrigerant has been substantially transferred to the oil in the vessel to confine the refrigerant within the vessel.

10. The method of refrigerant recovery of claim 9 further comprising rocking said pressure vessel periodically to wet said packing means with said oil.

11. The method of refrigerant recovery of claim 10 further comprising heating the refrigerant in said equipment to facilitate flow of the refrigerant vapor therefrom to said pressure vessel.

12. The method of refrigerant recovery of claim 9 wherein said equipment has a compressor for said refrigerant, but the flow of the refrigerant from the equipment to said pressure vessel is carried out without running said compressor.

13. The method of refrigerant recovery of claim 9 further comprising cooling said pressure vessel to facilitate absorption of said refrigerant vapor by said oil.

14. The method of refrigerant recovery of claim 13 wherein said cooling is carried out in a water bath.

* * * * *